Aug. 29, 1961 P. L. FRANCIS 2,998,244
SELF-LEVELING FLUID SPRING
Filed May 14, 1959 3 Sheets-Sheet 1

INVENTOR.
Philip L. Francis
BY
W. F. Wagner
ATTORNEY

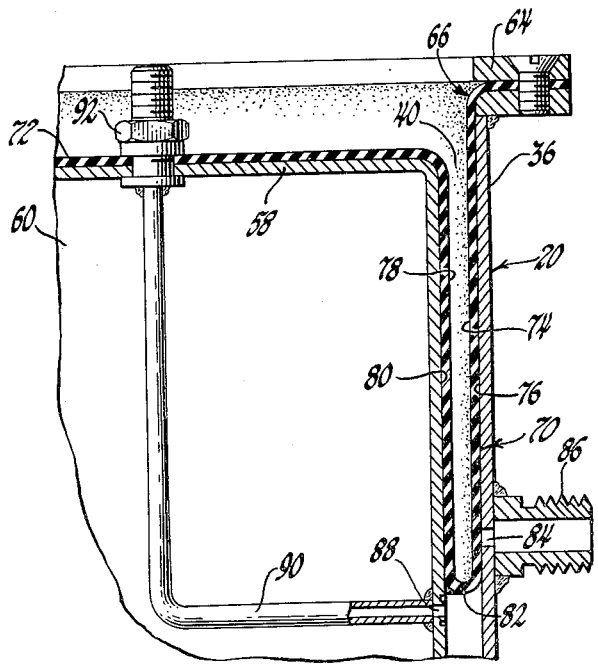
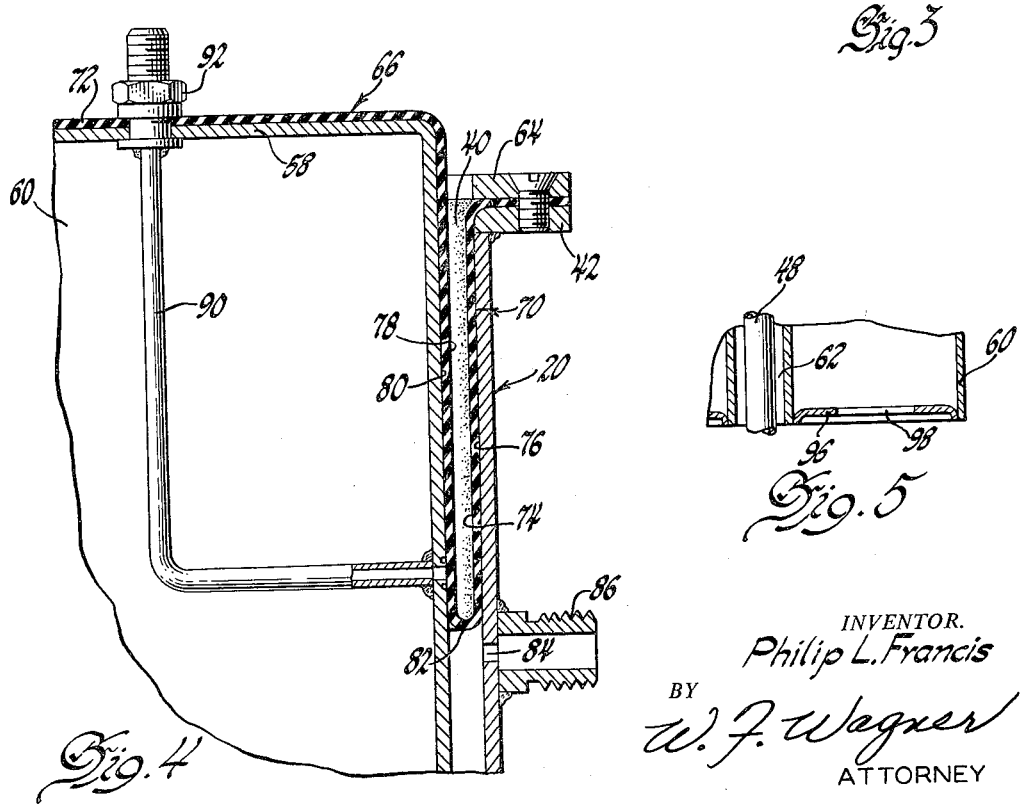

Aug. 29, 1961 P. L. FRANCIS 2,998,244
SELF-LEVELING FLUID SPRING
Filed May 14, 1959 3 Sheets-Sheet 3

INVENTOR.
Philip L. Francis
BY
W. F. Wagner
ATTORNEY

United States Patent Office 2,998,244
Patented Aug. 29, 1961

2,998,244
SELF-LEVELING FLUID SPRING
Philip L. Francis, Pontiac, Mich., assignor to General Motors Corporation, Detroit, Mich., a corporation of Delaware
Filed May 14, 1959, Ser. No. 813,160
19 Claims. (Cl. 267—65)

This invention relates to fluid springs and more particularly, although not exclusively, to fluid spring devices for wheeled vehicles.

An object of the present invention is to provide an improved fluid spring.

Another object is to provide an improved vehicle suspension system.

Still another object is to provide a vehicle suspension system which is simple, economical, and reliable.

A further object is to provide a suspension system incorporating fluid spring devices which are self-regulating to vary resistance in accordance with the load supported thereon.

Still another object is to provide a suspension system including fluid operated load leveling means which are so constructed and arranged that leveling action of the spring is a direct function of displacement thereof.

Yet a further object is to provide in a suspension of the stated character, vacuum energized spring devices including two relatively displaceable members, wherein supply of vacuum to the spring and exhaust therefrom is regulated entirely by displacement relation of the members, thereby totally eliminating auxiliary external or internal follower type regulating mechanisms.

A still further object is to provide in an arrangement of the stated character, a spring comprising a piston, cylinder, and a rolling diaphragm, wherein the piston and cylinder are provided with suitable ports arranged with reference to the rolling diaphragm so that displacement of the piston in one direction causes increase in vacuum level, while displacement of the piston in the opposite direction causes decrease in the vacuum level.

Yet another object is to provide a fluid spring comprising an upright cylinder having a piston reciprocably disposed therein and a rolling lobe type diaphragm extending between the cylinder and piston, the cylinder and piston having adjacent peripheral walls spaced radially from each other and the diaphragm having an annular loop including extended wall portions overlying the adjacent piston and cylinder walls, the cylinder having a port formed in the wall thereof adapted for connection to a vacuum source and the piston having a vacuum vent port formed in the wall thereof which is vertically aligned with the first mentioned port when the spring is in the normal displacement position, said ports both being located with reference to the lower extremity of the loop of the rolling diaphragm so that displacement of the piston in one direction uncovers one port, while displacement thereof in the opposite direction uncovers the other port.

A still further object is to provide a spring of the stated character in which the piston is constructed in the form of an annulus which may alternatively be either closed or open, thereby allowing variation of the rate curve of the spring.

Still a further object is to provide a spring arrangement of the type described which will operate effectively and efficiently from any one of several existing sources of vacuum present in production passenger vehicles.

A yet further object is to provide a fluid spring of the type described wherein the periphery of the spring piston immediately adjacent the vacuum vent port is formed in such a way as to provide a localized pressure differential across the diaphragm wall adjacent the port as the diaphragm progressively overlaps the latter.

These and other objects, advantages, and features of the invention will become more fully apparent as reference is had to the accompanying specification and drawings wherein:

FIG. 3 is an enlarged fragmentary view, partly in section, of a portion of the spring illustrated in FIG. 2, showing the displacement relation of certain parts thereof when the spring is deflected toward the rebound position;

FIG. 4 is a view similar to FIG. 3 showing the corresponding displacement relation when the spring is deflected toward the bump position;

FIG. 5 is an enlarged fragmentary view, partly in section, illustrating a modified form of the piston utilized in the invention;

Figure 1:
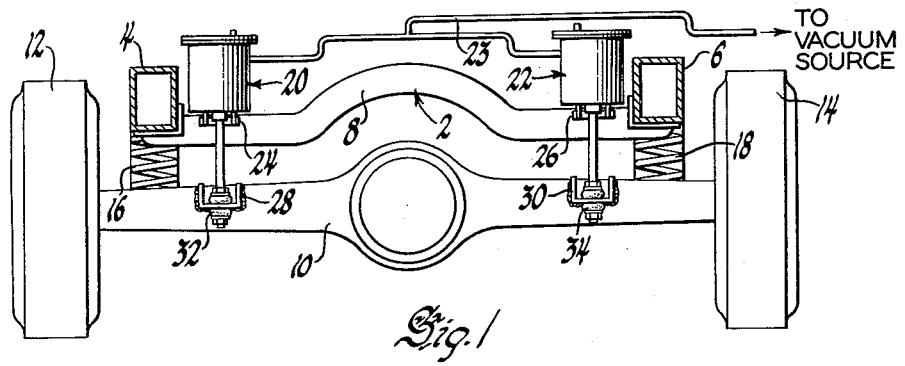
FIG. 1 is an end elevational view of a vehicle rear suspension incorporating the invention.

Referring now to the drawings and particularly FIG. 1, the reference numeral 2 designates the frame portion of the vehicle sprung mass which includes a pair of laterally spaced side rails 4 and 6 and a cross member 8. Disposed below and extending transversely of the frame is the vehicle rear axle assembly 10, at opposite ends of which traction wheels 12 and 14 are rotatably supported. In the embodiment shown, primary suspension of frame 2 relative to wheels 12 and 14 is accomplished by coil springs 16 and 18. It will be understood, however, that springs 16 and 18 are shown for illustrated purposes only, any other conventional spring being equally suitable. Further, as will appear hereinafter, such springs may be dispensed with entirely.

In order to assist springs 16 and 18 in supporting the sprung mass of the vehicle and assure constant vertical displacement of the sprung mass of the vehicle regardless of the load imposed thereon, according to the present invention there are provided a pair of load levelizing helper spring devices 20 and 22, which are connected to frame 2 by means of swivel structures 24 and 26 and to brackets 28 and 30 on axle 10 by universal flexible mounts 32 and 34. Spring devices 20 and 22 are energized by vacuum derived from any suitable source such as the engine intake manifold, vacuum pump, or vacuum storage tank normally provided in power brake installations, through vacuum conduit 23.

Figure 2:
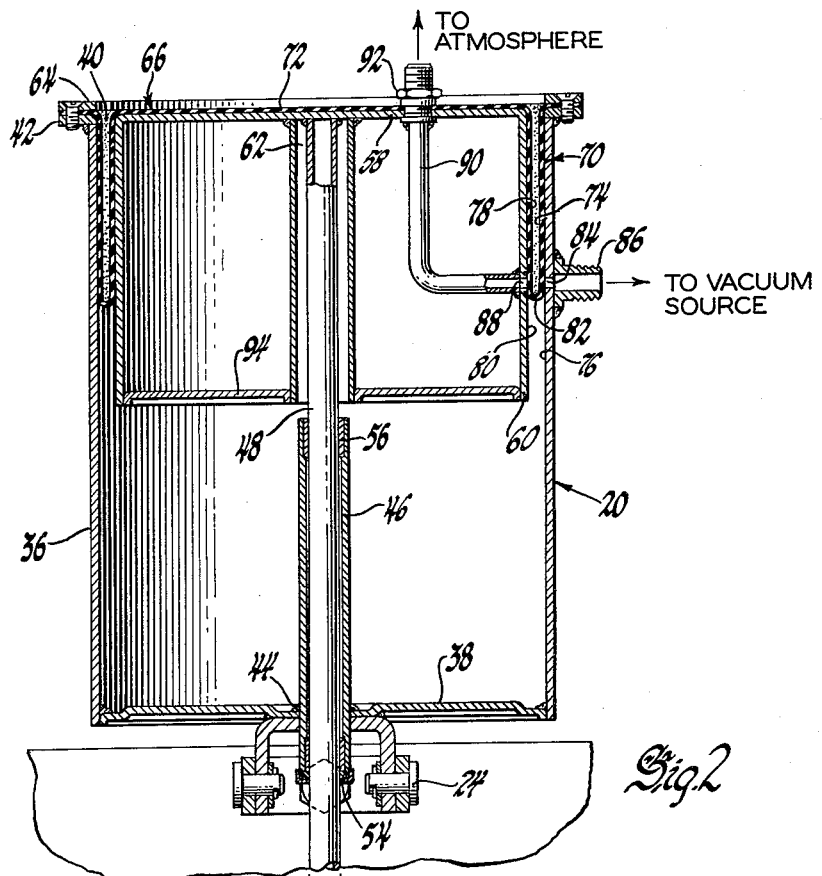
FIG. 2 is an enlarged elevational view, partly in section and with parts broken away, showing the form, construction, and arrangement of a fluid spring according to the invention.

Inasmuch as springs 20 and 22 are identical in construction and operation, the following description of spring 20 will be understood to apply equally to both. Referring now to FIG. 2, it will be seen that spring 20 comprises an upright cylinder 36 having a closed bottom wall 38 and an open upper end 40 bounded by a radially outwardly extending flange 42. Connected to bottom wall 38 as by welding 44 and extending upwardly into the interior of cylinder 36 in concentric relation therewith is a guide sleeve 46. Slidably disposed in sleeve 46 is a piston rod 48, the lower end 50 of which is adjustably secured to the threaded stud portion 52 of flexible connection 32, previously mentioned. At its lower and upper ends, respectively, guide sleeve 46 is provided with fluid tight seals 54 and 56 which tightly embrace the outer periphery of piston rod 48 but allow reciprocation thereof. At its upper end, rod 48 is connected, as by welding, to the top wall 58 of a piston 60 of annular configuration. Piston 60 is somewhat smaller in outside diameter than the inside diameter of cylinder 36 and normally occupies a vertical position in which the top wall 58 thereof is in flush relation with flange 42 of cylinder 36. The annulus formed by piston 60 provides a central cylindrical relieved portion 62 which permits downward displacement of piston 60 until the top wall thereof is substantially flush with the upper end of guide sleeve 46.

Disposed over the open end 40 of cylinder 36 is a thin membrane or diaphragm 66 which has its outer periphery secured to the radial flange 42 by a clamp ring 64. As seen in the drawings, diaphragm 66 includes an intermediate depending rolling lobe portion 70 and a central portion 72 which overlies the top wall 58 of piston 60. Rolling lobe 70 includes a portion 74 which overlies the inner surface of cylinder wall 76 and a portion 78 which overlies the vertically adjacent outer surface of piston wall 80. Portions 74 and 78 terminate in a loop extremity 82.

In accordance with the principal feature of the invention, the wall 76 of cylinder 36 is provided with an aperture or port 84 which is adapted for connection to any suitable vacuum source, previously mentioned, by a fitting 86. Aperture 84 is located in vertical relation to loop 82 so that the former is normally closed by the lower extremity of portion 74 of diaphragm 66. Similarly, the wall 80 of piston 58 is formed with an aperture 88 which is normally aligned with aperture 84 and is, therefore, closed by the lower extremity of portion 78. Aperture 88 communicates with atmosphere via tube 90 which extends through a fluid-tight fitting 92 secured on the top wall 58 of piston 60 and the adjacent diaphragm central portion 72.

Operation of the invention

At normal curb weight, the sprung mass is depressed to the level shown in FIG. 1. Under these conditions, the components of spring device 36 assume the relationship shown in FIG. 2 in which case communication between the interior of cylinder 36 and the source of vacuum is blocked, as is communication with atmosphere. Upon entrance of passengers or other increase in supported load, the sprung mass of the vehicle descends with the result that cylinder 36 is initially displaced downwardly in relation to piston 60. However, as seen best in FIG. 4, this downward displacement of the cylinder results in progressive peeling of the diaphragm portion 74 away from the wall 76 of cylinder 36 onto the wall of piston 58. As a result, the loop extremity 82 is displaced upwardly uncovering port 84 and establishing communication between the interior of cylinder 36 and the vacuum source. As long as port 84 is open, the vacuum source acts to progressively induce a higher order of vacuum in the cylinder 36. As the vacuum in cylinder 36 increases, the effective pressure of atmospheric air on piston 58 increases toward the maximum of 14.2 p.s.i. Therefore, as soon as the ratio of external atmospheric to internal sub-atmospheric pressure is reached which will support the increased load, cylinder 36 is restored to the normal displacement position shown in FIG. 2, whereupon further communication with the vacuum source is terminated by reason of the return of the lower extremity of portion 74 to overlapping engagement with port 84. Conversely, when the suspended load of the vehicle is reduced, the ratio between external atmospheric and internal sub-atmospheric pressure is in excess of that required to support the remaining sprung load, with the result that cylinder 36 is displaced upwardly with respect to piston 60, as seen in FIG. 3. In the same manner as described with respect to FIG. 4, diaphragm portion 78 peels away from the wall 80 of piston 60 onto the wall 76 of cylinder 36. However, in this instance, the peeling action increases the degree of overlapping of port 84 by portion 74, while totally uncovering port 88 in piston wall 80, thereby permitting the excessive vacuum in cylinder 36 to be reduced by atmosphere bleeding into the cylinder through tube 90. This bleeding action continues only until a ratio of atmospheric to sub-atmospheric pressure is reached which is sufficient to support the sprung load at the predetermined design height, at which time cylinder 36 has descended so that ports 84 and 90 are in alignment and are equally overlapped by the lower extremities of portions 74 and 78.

It will now be seen that a spring construction in accordance with the present invention is entirely self-operating to provide a resilient support which will maintain the supported load at a constant height regardless of variation in the load. Of particular importance is the total absence of auxiliary valve mechanism for regulating fluid flow into and out of the spring device. In the present case, fluid flow is a direct function of the displacement relationship of the piston and cylinder with respect to the rolling diaphragm. This arrangement not only simplifies the design problem, but very significantly reduces cost in terms of complexity and number of components as well as assembly time. Furthermore, no initial adjustment is required, nor is it possible for the adjustment relation to become altered in operation. Still further, extraordinary service life of the valving may be expected, owing to the lack of any moving parts. Still another advantage in the construction lies in the fact that any desired displacement "dwell" or range of displacement before leveling action takes place, may readily be obtained merely by preselecting a diaphragm dimension which will provide a port overlap of suitable length.

Needless to say, the leveling function accomplished in accordance with the present invention offers extraordinary economies in comparison with prior art devices which have without exception involved additional mechanical elements and means for synchronizing the operation thereof with the displaced relation of the piston and cylinder. These economies coupled with the total elimination of any need for a special purpose source of spring fluid contributes enormously to the provision of a suspension device of extraordinary economy and reliability.

In connection with the means for energizing a spring of the type disclosed, it has been found that any one of the normal sources of vacuum present in a conventional passenger vehicle is more than adequate for the requirements herein presented. In this connection, it is also to be noted that relatively high pressures such as are required in pneumatic and hydropneumatic springs are not here involved. As a result, physical strength requirements for the diaphragm are greatly reduced, thereby permitting the use of relatively inexpensive and light materials. Naturally, the very low pressures also tend to enhance the service life of the affected parts.

According to another feature of the invention, the annular form of piston 60 provides a simple and effective manner in which to alter the rate curve of the spring device. In the embodiment of FIG. 2, piston 60 is formed with an imperforate lower wall 94, while in the embodiment of FIG. 5, piston 60 is formed with a lower wall 96 having an aperture 98 formed therein. It will be understood that the respective constructions represent two alternative forms of piston 60. In the embodiment of FIG. 2, the total volume of sub-atmospheric air acted upon by upward piston deflection would be substantially less than the total volume acted upon in the embodiment of FIG. 5, since the entire volume of piston 60 is added to the working volume in cylinder 36. Accordingly, in the former case, the rate build up proceeds more rapidly than in the latter, thus offering a choice of rate curves without modification of the overall spring configuration.

Figure 6:
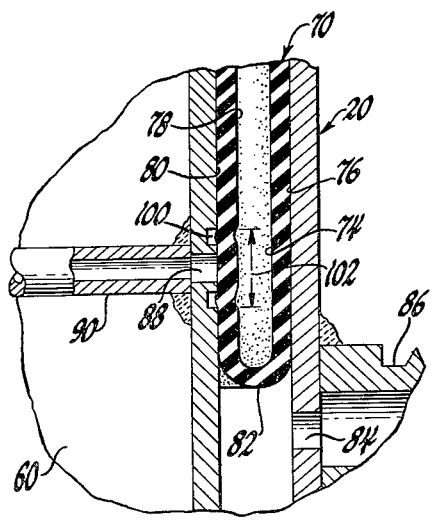
FIG. 6 is an enlarged fragmentary sectional view illustrating the detailed configuration of the port area associated with the piston shown in FIGS. 2, 3, and 4.

In FIG. 6, there is shown a greatly enlarged view of the area surrounding atmosphere bleed port 88, which according to a further feature of the invention is so formed that optimum sealing of the port by the diaphragm portion 78 is assured. As seen in FIG. 6, the outer surface of the area of piston wall 80 immediately surrounding port 88 is coined or trepanned to provide an annular radially outwardly facing groove or recess 100. Groove 100 coacts with diaphragm portion 78 to assure positive sealing of port 88 by the area 102 of diaphragm portion 78 bounded by the groove. In operation, groove 100 functions as follows. Assume that the vehicle load condition is such that the piston is initially in a displaced position wherein port 88 is uncovered (FIG. 3). As previously described, cylinder 36 will then descend relative to piston 60. As this relative motion occurs, diaphragm portion 78 progressively overlaps groove 100, moving from top to bottom. Throughout the period in which overlapping of groove 100 is incomplete, the cavity formed between the groove and diaphragm portion 78 maintains communication with sub-atmospheric pressure within cylinder 36, owing to the fact that the lower extremity of the groove is still uncovered. Therefore, a pressure differential exists across that part of the diaphragm portion 78 overlying groove 100. Since this pressure differential is maintained by the action just described, upon completion of overlapping of groove 100, the pressure differential then exists across a circular area bounded by groove 100. This results in sealing of port 88 owing to the fact that the effective area of groove 100 is considerably in excess of the effective area of port 88. Therefore, although no pressure differential exists at opposite sides of the diaphragm in the port abutting area 88, bleeding of atmospheric air into cylinder 36 is prevented by the seal effected by the pressure differential across the area of diaphragm portion 78 bounded by groove 100. It will thus be seen that any tendency for atmospheric air to bleed past the lower extremity 82 of diaphragm 66 into the spring is effectively prevented.

Figure 7:
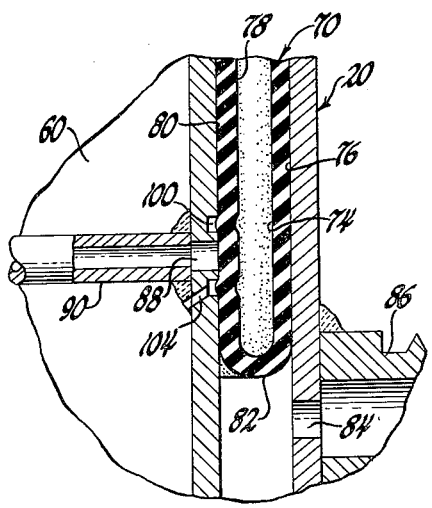
FIG. 7 is a view similar to FIG. 6 illustrating a modified form of the port area.

In FIG. 7, there is illustrated a modification of the construction of FIG. 6. In the modification shown, annular groove 100 is arranged in communicating relation with the interior of spring cylinder 36 by means of a small orifice extending through piston wall 80. Such communication may be effected by utilizing the modified piston configuration shown in FIG. 5 or other suitable means. Operation of the modification of FIG. 7 is identical to that described in connection with FIG. 6, with the exception that orifice 104 provides continuing communication with sub-atmospheric pressure in the spring and thus completely eliminates any possibility of loss of sub-atmospheric pressure within the groove, thereby absolutely insuring the continuing existence of a pressure differential across the area of diaphragm portions 78 bounded by the groove.

Figure 8:
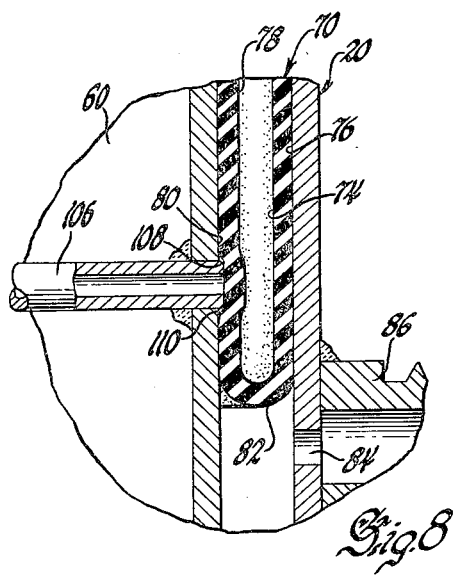
FIG. 8 is a view similar to FIG. 5 illustrating another modified form of the port area.

In FIG. 8, there is shown a further modification of the structure shown in FIGS. 6 and 7. In the embodiment shown, the atmosphere bleed tube 106 is arranged to extend through the wall 80 of piston 60 so that the terminal end of the former projects slightly outward from the piston wall outer surface to form a nipple 108. When tube 106 is arranged in this manner, trepanning or coining of wall 80 in the area surrounding port 88 is unnecessary. As will be seen in the drawing, when diaphragm portion 78 lies in overlapping engagement with port 88, nipple 108 distorts the wall of diaphragm portion 78 radially outwardly from piston wall 80 so as to provide an annular pocket 110 of distorted triangular cross section which is subjected to sub-atmospheric pressure in the same manner described with respect to FIG. 6. It will be understood that the embodiment of FIG. 8 may also be combined with the modification according to FIG. 7 by the provision of an orifice similar to 104.

Although the present invention has been described in terms of an auxiliary load leveling device for use in conjunction with primary suspension springs, it is to be clearly understood that its capabilities are not so limited and that it may be designed to perform the entire load supporting and leveling function if so desired. It is also to be understood that the invention may be used with equal efficacy in environment wherein the spring device is subjected to tension as a result of increase in supported load rather than by compression as herein illustrated. It is also recognized that the invention is applicable to a wide range of non-vehicular supports.

While but two embodiments of the invention have been shown and described, it will be apparent that other changes and modifications may be made therein. It is, therefore, to be understood that it is not intended to limit the invention to the embodiments shown, but only by the scope of the claims which follow.

I claim:
 1. In a fluid spring of the type including a cylinder and piston arranged in telescoping relation with an annular interval therebetween closed by a rolling diaphragm, the improvement which consists in providing an inlet port in the cylinder wall and an outlet port in the piston wall, which ports are disposed at the same level when the spring is in its normal load supporting position and located with reference to said rolling diaphragm so that upward displacement of said piston causes progressively decreasing diaphragm overlap of said inlet port and progressively increasing overlap of said outlet port, and vice versa.

2. In a piston, cylinder, and diaphragm fluid spring of the type utilizing internal sub-atmospheric pressure, means for controlling the magnitude of sub-atmospheric pressure comprising, a port in the cylinder communicating with a source of vacuum, a port on the piston communicating with atmospheric, and a rolling lobe on the diaphragm having wall portions normally overlapping both of said ports under the influence of said subatmospheric pressure, displacement of said piston in one direction causing one of said wall portions to peel off said piston onto said cylinder thereby uncovering the port in said piston and displacement of said piston in the other direction causing the other wall portion to peel off said cylinder unto said piston and thereby uncover the port in said cylinder.

3. In a piston, cylinder, and diaphragm fluid spring of the type utilizing internal sub-atmospheric pressure, means for controlling the magnitude of sub-atmospheric pressure comprising, a port extending through the peripheral wall of said cylinder communicating with a source of vacuum, a port extending through the peripheral wall of said piston communicating with atmosphere, and a rolling lobe on the diaphragm having wall portions normally overlapping both of said ports and compressively urged into sealing engagement therewith under the influence of said sub-atmospheric pressure, displacement of said piston in one direction causing one of said wall portions to peel off said piston onto said cylinder thereby uncovering the port through said piston wall and displacement of said piston in the other direction causing the other wall portion to peel off said cylinder unto said piston and thereby uncover the port through said cylinder.

4. In a piston, cylinder, and diaphragm fluid spring of the type utilizing internal sub-atmospheric pressure, means for controlling the magnitude of sub-atmospheric pressure comprising, a pair of ports formed respectively in the peripheral wall of said cylinder and piston, one of said ports communicating with atmosphere and the other with a source of vacuum, a rolling lobe on the diaphragm normally overlapping the peripheral walls of said piston and cylinder to an extent causing blocking of both of said ports under the influence of said sub-atmospheric pressure, displacement of said piston in one direction causing the rolling lobe to peel off one wall and onto the other and vice versa, whereby said ports are alternately uncovered in relation to the direction of displacement of the piston from a predetermined normal position.

5. In combination, a cylinder, a piston loosely telescoped in said cylinder, a diaphragm connecting said piston and cylinder having a looped intermediate portion including walls overlapping the inner periphery of said cylinder and the outer periphery of said piston, a port in said cylinder spaced from the extremity of said loop, a port in the piston normally aligned with said first mentioned port, means connecting said first port with a source of vacuum, means connecting said second port to atmosphere, and means including a cavity surrounding said second port effective to establish a pressure differential across the diaphragm wall in an area axially aligned with said port.

6. In combination, a cylinder, a piston loosely telescoped in said cylinder, a diaphragm connecting said piston and cylinder having a looped intermediate portion including walls overlapping the inner periphery of said cylinder and the outer periphery of said piston, a port in said cylinder spaced from the extremity of said loop, a port in the piston normally aligned with said first mentioned port, means connecting said first port with a source of vacuum, means connecting said second port to atmosphere, and means forming a closed annular cavity surrounding said second port wherein said diaphragm is in overlapping engagement with said port.

7. A fluid spring comprising, in combination, a cylinder element having one closed end, a plunger element coaxially through the open end of the cylinder element, a diaphragm connecting said elements including a depending rolling lobe portion closing the annular interval between said elements, a pair of ports extending respectively radially through said cylinder element and piston element at vertical levels above the lower extremity of said rolling lobe, whereby both of said ports are closed by said lobe when said piston is in predetermined displaced relation to said cylinder, and one or the other of said ports is open for communication with the interior of said cylinder when said piston is displaced a predetermined amount above or below said first mentioned predetermined position.

8. A fluid spring comprising, in combination, a cylinder element having a lower closed end and an open upper end bounded by a radial flange, a plunger element extending coaxially through the open end of the cylinder element, said piston having an upper closed end, tubular guide means for said piston rigidly secured to the cylinder closed end, a diaphragm connecting said elements including an outer peripheral portion attached to said flange, a depending rolling lobe portion closing the annular interval between said elements and a central portion overlying the upper closed end of said piston, a pair of ports extending radially through said cylinder element and piston element, respectively, said ports being disposed at vertical levels above the lower extremity of said rolling lobe, whereby both of said ports are closed by said lobe when said piston is in predetermined displaced relation to said cylinder, and one or the other of said ports is open for communication with the interior of said cylinder when said piston is displaced a predetermined amount above or below said first mentioned predetermined position.

9. In combination, a cylinder having a closed lower end wall, a guide tube secured to said end wall and extending into said cylinder, a piston rod slidably disposed in said tube, a piston connected to the upper end of said rod, said piston having a depending wall, the outer periphery of which is spaced from the inner peripheral wall of said cylinder, a flexible diaphragm connecting said piston and cylinder, said diaphragm including a depending looped intermediate portion including vertical portions overlapping the inner periphery of said cylinder and the outer periphery of said piston, a port in said cylinder spaced upwardly from the lower extremity of said looped portion, a port in the piston normally aligned with said first mentioned port, means connecting said first port with a source of vacuum, and means connecting said second port to atmosphere.

10. In combination, a cylinder having a closed lower end wall, a guide tube secured to said end wall and extending into said cylinder, a piston rod slidably disposed in said tube, an inverted cup-shaped piston connected to the upper end of said rod, said piston having a depending wall, the outer periphery of which is spaced from the inner peripheral wall of said cylinder, a flexible diaphragm connecting said piston and cylinder, said diaphragm including a depending looped intermediate portion including vertical portions overlapping the inner periphery of said cylinder and the outer periphery of said piston, a port in said cylinder spaced upwardly from the lower extremity of said looped portion, a port in the piston normally aligned with said first mentioned port, means connecting said first port with a source of vacuum, and means including a tubular member extending through the top wall of said piston and connecting said second port to atmosphere.

11. The structure set forth in claim 10 wherein said guide tube includes spaced fluid tight seals embracing said piston rod.

12. The structure set forth in claim 10 wherein said piston is constructed in the form of an imperforate annulus.

13. The structure set forth in claim 10 wherein said piston is constructed in the form of a perforate annulus, the perforation allowing communication between the interior of said cylinder and the interior of said piston.

14. In combination with the sprung and unsprung mass of a vehicle, a fluid spring comprising a vertically extending cylinder member pivotally attached to the sprung mass, a piston member pivotally attached to the unsprung mass and extending into said cylinder, said piston member being dimensioned so as to provide an annular interval between the peripheral wall thereof and the peripheral wall of said cylinder member, a depending roll lobe closing the annular interval between said members, a pair of ports extending respectively through the wall of said cylinder and the wall of said piston and located therein so that with the sprung mass of the vehicle at a predetermined height above the unsprung mass both of said ports are closed by said rolling lobe, the port in said cylinder being arranged in communication with a source of vacuum and the port in said piston being arranged in communication with atmosphere whereby downward displacement of said sprung mass causes relative displacement between said cylinder and piston effective to position the port in said cylinder below said rolling lobe and allow the source of vacuum to induce sub-atmospheric pressure in the interior of said cylinder whereby external atmospheric pressure acting on said piston and rolling lobe provides resilient force tending to restore the sprung mass of the vehicle to said predetermined height, while upward displacement of the sprung mass causes opposite relative displacement of the piston and cylinder thereby opening the port in said piston and venting the interior of said cylinder to atmosphere so that sub-atmospheric pressure therein is reduced until the sprung mass is restored to the predetermined height.

15. In combination with a vehicle having the sprung mass thereof supported relative to the unsprung mass by one or more primary springs, a load leveling auxiliary spring device comprising a cylinder member having one closed end, means attaching said cylinder to the sprung mass, a piston member extending into the open end of said cylinder, means pivotally connecting said piston to the unsprung mass, said piston member being dimensioned so as to provide an annular interval between the peripheral wall thereof and the peripheral wall of said cylinder member, a depending roll lobe closing the annular interval between said members and embracing said peripheral walls, a port extending through the wall of each of said cylinder and piston members and located thereon so that when the sprung mass of the vehicle is at a predetermined height above the unsprung mass both of said ports are blocked by embracing engagement of said rolling lobe, the port in said cylinder being arranged in communication with a source of vacuum and the port in said piston being arranged in communication with atmosphere whereby downward displacement of said sprung mass causes relative displacement between said cylinder and piston effective to move the port in said cylinder to a position below said rolling lobe and allow creation of a partial vacuum in the interior of said cylinder whereby atmospheric pressure acts on said piston and rolling lobe to provide resilient force tending to elevate the sprung mass of the vehicle to the predetermined height, while upward displacement of the sprung mass induces opposite relative displacement of the piston and cylinder thereby opening the port in said piston and venting the interior of said cylinder to atmosphere so that the partial vacuum therein is reduced sufficiently to allow the sprung mass to descend to the predetermined height.

16. The structure set forth in claim 14 wherein the means attaching said cylinder to the sprung mass is located at the lower end of said cylinder.

17. In combination, a cylinder, a piston loosely telescoped in said cylinder, a diaphragm connected to said cylinder and extending across said piston, a single convolution looped intermediate section on said diaphragm including wall portions overlapping the inner periphery of said cylinder and the outer periphery of said piston, respectively, a port extending through the wall of said cylinder spaced from the extremity of said loop, a port extending through the wall of said piston normally aligned with said first mentioned port, an annular recess formed in the outer periphery of said piston surrounding said port, means connecting said first port with a source of vacuum, and means connecting said second port to atmosphere.

18. The structure set forth in claim 6 wherein said second port is formed in a tube secured in and extending through said piston and projecting outwardly from the periphery thereof, said cavity occurring in an annulus of generally triangular cross section bounded by the piston periphery, tube projection, and diaphragm wall.

19. The structure set forth in claim 17 including an orifice formed in said piston effective to establish continuous communication between said groove and the interior of said cylinder.

References Cited in the file of this patent

UNITED STATES PATENTS

| | | |
|---|---|---|
| 1,111,739 | Davis | Sept. 29, 1914 |
| 1,974,171 | Bizzarri | Sept. 18, 1934 |
| 2,393,942 | Taylor | Jan. 29, 1946 |
| 2,427,927 | Schutte | Sept. 23, 1947 |
| 2,720,218 | Otto | Oct. 11, 1955 |